(12) United States Patent
Conner et al.

(10) Patent No.: US 9,037,319 B2
(45) Date of Patent: May 19, 2015

(54) SYSTEM AND METHOD FOR PROCESSING AND DISPLAYING WAKE TURBULENCE

(71) Applicant: HONEYWELL INTERNATIONAL INC., Morristown, NJ (US)

(72) Inventors: Kevin J Conner, Kent, WA (US); Yasuo Ishihara, Kirkland, WA (US); Ray Berry, Redmond, WA (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 14/035,114

(22) Filed: Sep. 24, 2013

(65) Prior Publication Data
US 2015/0088342 A1 Mar. 26, 2015

(51) Int. Cl.
| | |
|---|---|
| *G01W 1/08* | (2006.01) |
| *G01W 1/10* | (2006.01) |
| *B64D 43/00* | (2006.01) |
| *G01S 13/95* | (2006.01) |

(Continued)

(52) U.S. Cl.
CPC .............. *B64D 45/00* (2013.01); *G08G 5/0008* (2013.01); *G08G 5/0091* (2013.01); *B64D 43/00* (2013.01); *G08G 5/0021* (2013.01); *G01W 1/08* (2013.01); *G01W 1/10* (2013.01); *G01C 23/005* (2013.01); *G08G 5/0078* (2013.01); *G01S 13/953* (2013.01); *G05D 1/046* (2013.01); *G01W 2001/003* (2013.01)

(58) Field of Classification Search
CPC .. G01C 23/005; G01S 13/953; G08G 5/0021; G08G 5/0091; G08G 5/0008; G08G 5/0078; G05D 1/046; B64D 43/00; G01W 1/08; G01W 1/10; G01W 2001/003

USPC .................. 701/3, 14, 120, 300, 301; 342/29; 340/945, 961, 968; 73/170.02
See application file for complete search history.

(56) References Cited

U.S. PATENT DOCUMENTS

| | | | |
|---|---|---|---|
| 5,262,773 A | 11/1993 | Gordon | |
| 5,657,009 A | 8/1997 | Gordon | |

(Continued)

FOREIGN PATENT DOCUMENTS

| | | |
|---|---|---|
| DE | 10039109 A1 | 2/2002 |
| JP | 2010190772 A | 9/2010 |

(Continued)

OTHER PUBLICATIONS

Olsen, John H. et al.: "Aircraft Wake Turbulence and Its Detection" Final Report, Boeing Scientific Research Labs Seattle Washington, Jan. 1971, Accession No. AD0730100; retrieved from the Internet on Aug. 7, 20136; URL: http://oai.dtic.mil/oai/oai?verb=getRecord&metadataPrefix=html&identifier=AD0730100, 1 pg.

(Continued)

*Primary Examiner* — Russell Frejd
(74) *Attorney, Agent, or Firm* — Ingrassia Fisher & Lorenz, P.C.

(57) ABSTRACT

A system and method to display, when within an envelope of an ownship's flight path, a symbol representing wake turbulence from another aircraft based on aircraft type and flight parameters received from the other aircraft, the symbol being formatted to indicate the severity of portions of the wake turbulence. The format is modified periodically in accordance with the aircraft's flight path and a decay rate of the wake turbulence.

20 Claims, 5 Drawing Sheets

(51) Int. Cl.
  *B64D 45/00* (2006.01)
  *G08G 5/00* (2006.01)
  *G01C 23/00* (2006.01)
  *G05D 1/04* (2006.01)
  *G01W 1/00* (2006.01)

(56) References Cited

U.S. PATENT DOCUMENTS

| | | | |
|---|---|---|---|
| 6,177,888 B1 | 1/2001 | Cabot et al. | |
| 6,424,408 B1 | 7/2002 | Ooga | |
| 6,453,231 B1 | 9/2002 | Ooga | |
| 6,501,392 B2 * | 12/2002 | Gremmert et al. | 340/971 |
| 6,703,945 B2 | 3/2004 | Kuntman et al. | |
| 6,828,922 B1 * | 12/2004 | Gremmert et al. | 340/949 |
| 6,963,291 B2 | 11/2005 | Holforty et al. | |
| 7,463,955 B1 * | 12/2008 | Robinson et al. | 701/3 |
| 7,471,995 B1 * | 12/2008 | Robinson | 701/3 |
| 7,874,522 B2 | 1/2011 | Lewis et al. | |
| 8,131,407 B1 * | 3/2012 | Robinson | 701/3 |
| 8,135,500 B1 * | 3/2012 | Robinson | 701/3 |
| 8,334,799 B2 | 12/2012 | Barbaresco | |
| 8,478,459 B2 | 7/2013 | Mutuel et al. | |
| 2002/0039072 A1 * | 4/2002 | Gremmert et al. | 340/945 |
| 2002/0075171 A1 | 6/2002 | Kuntman et al. | |
| 2002/0089432 A1 | 7/2002 | Staggs et al. | |
| 2003/0025714 A1 | 2/2003 | Ederson et al. | |
| 2010/0283635 A1 | 11/2010 | Brinkman et al. | |

FOREIGN PATENT DOCUMENTS

| | | |
|---|---|---|
| WO | 0010064 A1 | 2/2000 |
| WO | 2012103864 A2 | 8/2012 |
| WO | 2012170991 A1 | 12/2012 |

OTHER PUBLICATIONS

EP Extended Search Report for Application No. EP 14183943.1 Dated Mar. 18, 2015.

* cited by examiner

SYSTEM AND METHOD FOR PROCESSING AND DISPLAYING WAKE TURBULENCE

TECHNICAL FIELD

The exemplary embodiments described herein generally relate to aircraft wake turbulence and more particularly to processing and displaying wake turbulence to a pilot of an aircraft.

BACKGROUND

Worldwide air traffic is projected to double every ten to fourteen years and the International Civil Aviation Organization (ICAO) forecasts world air travel growth of five percent per annum until the year 2020. Such growth may cause degradation in safety and performance and an increase in an already high workload of the flight crew. One of the negative influences on flight safety has been has been the ability of an aircrew to visualize and avoid wake turbulence. The ability to process wake turbulence with transparent (understandable) representation on a display can significantly improve situational awareness of the flight crew resulting in increased flight safety and performance.

It is important for pilots to know the position of other aircraft in their airspace, and any pertinent wake turbulence, to ensure flight safety. Furthermore, the pilot must interpret the information provided, thereby occupying his thought processes when he may have many other decisions to make.

With increased availability of Automatic Dependent Surveillance-Broadcast (ADS-B) installations, Cockpit Display of Traffic Information (CDTI) displays can show surrounding traffic with increased accuracy and provide improved situation awareness. In the ADS-B system, aircraft transponders receive global positioning system (GPS) signals and determine the aircraft's precise position. This position is combined with other data and broadcast out to other aircraft and air traffic controllers. This display of surrounding traffic increases the pilot's awareness of traffic over and above that provided by Air Traffic Control (ATC). However, when the number of ADS-B targets become numerous, particularly in the vicinity of an airport, consideration of wake turbulence from each aircraft is difficult for the pilot to visualize.

Accordingly, it is desirable to provide a system and method for processing and displaying wake turbulence to a pilot of an aircraft. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

A system and method are provided for processing and displaying wake turbulence to a pilot of an aircraft.

In an exemplary embodiment, a system for displaying a wake turbulence of an aircraft with respect to an ownship comprises a plurality of data sources configured to determine a location, flight parameters, and a type of the aircraft; and a location, flight parameters, and a type of the ownship; a processor coupled to the plurality of data sources and configured to determine an envelope relating to a flight path of the ownship; a wake turbulence within the envelope of the aircraft in consideration of the location, flight parameters, and the type of the aircraft; periodically a decay rate of the wake turbulence; periodically a severity of the wake turbulence with respect to the decay rate; and a format indicating the severity; and a display coupled to the processor and configured to display the format of the wake turbulence.

In another exemplary embodiment, a system for displaying a wake turbulence of an aircraft with respect to an ownship comprises a plurality of data sources configured to determine a location, flight parameters, and a type of the aircraft; and a location, flight parameters, and a type of the ownship; a processor coupled to the plurality of data sources and configured to determine an envelope relating to a flight path of the ownship; a wake turbulence within the envelope of the aircraft in consideration of the location, flight parameters, and the type of the aircraft and the location and type of the ownship; a symbol for the wake turbulence, the symbol including a plurality of parallel lines formed perpendicular to the flight path of the aircraft; a severity of the wake turbulence of each of the lines of the symbol; and a decay rate for the severity of each of the lines of the symbol; and a display coupled to the processor and configured to display the symbol of the wake turbulence.

In yet another exemplary embodiment, a method for displaying a wake turbulence of an aircraft with respect to an ownship comprises determining a location, flight parameters, and a type of the aircraft; determining a location, flight parameters, and a type of the ownship; determining an envelope of concern relating to a flight path of the ownship; determining a wake turbulence within the envelope of the aircraft in consideration of the location, flight parameters, and the type of the aircraft; periodically determining a decay rate of the wake turbulence; periodically determining a severity of the wake turbulence with respect to the decay rate; determining a format indicating the severity; and displaying the format of the wake turbulence.

BRIEF DESCRIPTION OF THE DRAWINGS

The present invention will hereinafter be described in conjunction with the following drawing figures, wherein like numerals denote like elements.

DETAILED DESCRIPTION

Figure 1:
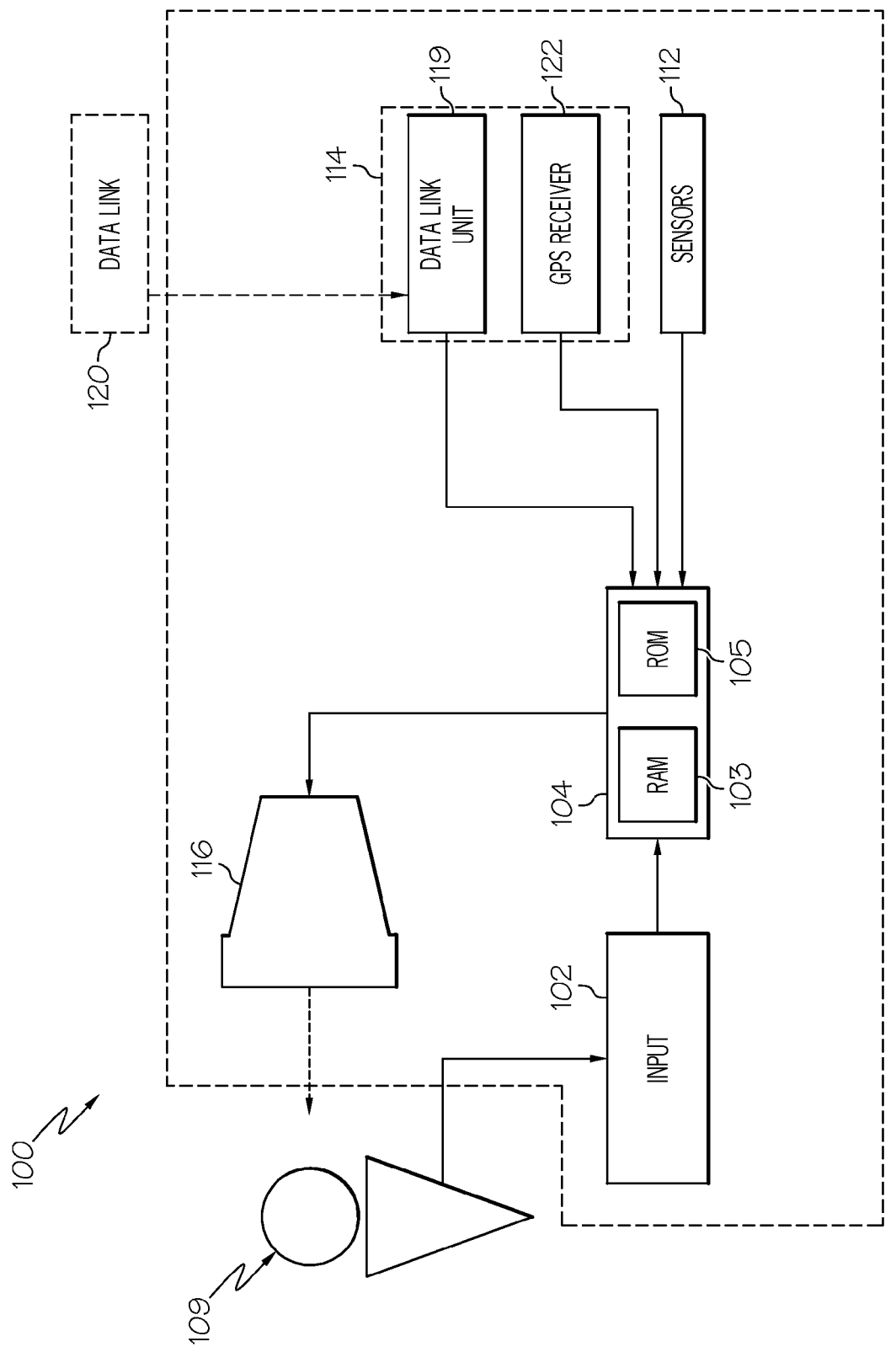
FIG. 1 is a block diagram of a known display system suitable for use in an aircraft in accordance with the exemplary embodiments described herein.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

While the exemplary embodiments described herein refer to displaying the information on aircraft, the invention may also be applied to other vehicle display systems such as displays in sea going vessels and displays used by off-site controllers, e.g., ATC and ground controllers for drones.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal Any of the above devices are exemplary, non-limiting examples of a computer readable storage medium In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

Technologies and concepts discussed herein relate to flight systems adapted for indicating, on a display device associated with an aircraft, wake turbulences that are important to the operation of the aircraft. The mapping methods described herein may be used with a variety of aircraft, such as planes and helicopters. The aviation environment is described herein as the exemplary embodiment and may include navigation from point to point or approach and landing at an airport. Various types of maps may be used for display on the lateral view, for example, road maps, terrain maps, aviation maps, and topographical maps.

Some applications may require more than one monitor, for example, a head down display screen, to accomplish the mission. These monitors may include a two dimensional moving map display. A moving map display may include a top-down view of the aircraft, the flight plan, and the surrounding environment. Various symbols are utilized to denote navigational cues, e.g., waypoint symbols, line segments interconnecting the waypoint symbols, range rings, and nearby environmental features, e.g., terrain, weather conditions, and political boundaries.

Alternate embodiments of the present invention to those described below may utilize whatever navigation system signals are available, for example a ground based navigational system, a global positioning system (GPS) navigation aid, a flight management system, and an inertial navigation system.

The location, including latitude/longitude and altitude, of the displayed first symbol of an ownship may be determined, for example, from a GPS, and for other aircraft from an ADS-B. ADS-B enhances safety by making an aircraft visible, real time, to ATC and to other appropriately equipped ADS-B aircraft with position and velocity data transmitted every second. The system relies on two avionics components: a high-integrity navigation source and a datalink for ADS-B. There are several types of certified ADS-B datalinks, but the most common ones operate at 1090 MHz, or at 978 MHz (USA only).

By using the ADS-B information, it is possible to accurately track other aircraft (traffic) positions. With this information and the type of aircraft it is possible to track potential wake turbulence left behind the traffic as it relates to the ownship. Wake turbulence severity depends on other traffic type, ownship type, winds, atmospheric turbulence, speed, and relative positions in three dimensional space. By tracking each segment of wake independently, it is possible to "age" the wake using ownship data and display the wake segment as individual lines that are colorized for the relative severity of the wakes. For example, a red line would be severe, yellow moderate, and green light. These are not based on time alone, but on a decay factor as will be described hereinafter.

An array stores the wake segments. Each wake segment will, at a minimum, contain the current location (latitude, longitude, and altitude), orientation (heading of traffic at time of generation), target altitude (drift down is a function of the generation altitude), and current severity index.

The ownship system defines coefficients for the levels of severity. Each level of severity, e.g., severe, moderate, light, would be defined by, for example, a different color and/or line weights and styles.

Wake turbulence severity depends on ownship type; traffic type, speed, and relative positions in three dimensional space; and environmental factors including winds and atmospheric turbulence. At each time interval, for example 1 second, a wake segment is sampled for all relevant aircraft. Relevancy is based on distance from ownship both in lateral and vertical directions. On each subsequent interval, all tracked segments of wake turbulence are "aged". This includes adjustments for wind speed and direction (can be determined from winds around the ownship or the other aircraft) and decay in severity. The decay factor is a function of sensed turbulence at the ownship. For example, the decay factor could vary from 0.9 (calm) to 0.2 (turbulent). This effectively decreases the severity every time interval. If a segment's severity drops below the lowest limit, it would be dropped from the tracking file.

Wake segments are displayed when within an envelope determined by their location relative to the ownship path and altitude. Typically, the envelope would comprise relative altitude (+3000/−1000) and a distance (+/−90 degrees of current track within 40 nm), or within 1 nm. Segments that are in the envelope are then drawn in reverse severity order to ensure that overlapping segments have the severe (red) are on top of any moderate (yellow), which in turn are on top of any light (green).

Sensing turbulence would involve using high pass filters, preferably on all three axes of acceleration. The resultant acceleration rate would be filtered to observe a longer term turbulence which would be indicative of the whole air mass. A sustained acceleration is most likely caused by the aircraft, while sudden changes are turbulence. These sudden changes are filtered and a magnitude is determined. A trend in the magnitude of the acceleration rate identifies a sustained turbulence.

Referring to FIG. 1, an exemplary flight deck display system 100 is depicted and will be described for displaying wake turbulences to a pilot within an aircraft. The system 100 includes a user interface 102, a processor 104, various optional sensors 112, various external data sources 114 for communicating with a datalink 120, and a display device 116. In some embodiments the user interface 102 and the display device 116 may be combined in the same device, for example, a touch pad. The user interface 102 is in operable communication with the processor 104 and is configured to receive input from a user 109, e.g., a pilot, and, in response to the user input, supply command signals to the processor 104. The user interface 102 may be any one, or combination, of various known user interface devices including, but not limited to, a cursor control device (not shown), such as a mouse, a trackball, or joystick, and/or a keyboard, one or more buttons, switches, or knobs.

The processor 104 may be any one of numerous known general-purpose microprocessors or an application specific processor that operates in response to program instructions. In the depicted embodiment, the processor 104 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

No matter how the processor 104 is specifically implemented, it is in operable communication with the display device 116, and is coupled to receive various types of inertial data from the various sensors 112, and various other avionics-related data from the external data sources 114. The processor 104 is configured, in response to the inertial data and the avionics-related data, and to supply appropriate display commands to the display device 116. The display device 116, in response to the display commands from the processor 104 selectively renders various types of textual, graphic, and/or iconic information. The preferred manner in which the textual, graphic, and/or iconic information are rendered by the display device 116 will be described in more detail further below. Before doing so, however, a brief description of the sensors 112, and the external data sources 114, at least in the depicted embodiment, will be provided.

The sensors 112 may be implemented using various types of inertial sensors, systems, and or subsystems, now known or developed in the future, for supplying various types of inertial data. The inertial data may also vary, but preferably include data representative of the state of the aircraft such as, for example, aircraft speed, heading, altitude, and attitude. The number and type of external data sources 114 may also vary. For example, the external systems (or subsystems) may include, for example, a traffic and collision avoidance system (TCAS) and a navigation computer. However, for ease of description and illustration, only an onboard datalink unit 119 and a GPS receiver 122 are depicted in FIG. 1, and will now be briefly described.

The GPS receiver 122 is a multi-channel receiver, with each channel tuned to receive one or more of the GPS broadcast signals transmitted by the constellation of GPS satellites (not illustrated) orbiting the earth. Each GPS satellite encircles the earth two times each day, and the orbits are arranged so that at least four satellites are always within line of sight from almost anywhere on the earth. The GPS receiver 122, upon receipt of the GPS broadcast signals from at least three, and preferably four, or more of the GPS satellites, determines the distance between the GPS receiver 122 and the GPS satellites and the position of the GPS satellites. Based on these determinations, the GPS receiver 122, using a technique known as trilateration, determines, for example, aircraft position, groundspeed, and ground track angle.

The display device 116, as noted above, in response to display commands supplied from the processor 104, selectively renders various textual, graphic, and/or iconic information, and thereby supply visual feedback to the user 109. It will be appreciated that the display device 116 may be implemented using any one of numerous known display devices suitable for rendering textual, graphic, and/or iconic information in a format viewable by the user 109. Non-limiting examples of such display devices include various cathode ray tube (CRT) displays, and various flat panel displays such as various types of LCD (liquid crystal display) and TFT (thin film transistor) displays. The display device 116 may additionally be implemented as a panel mounted display, a HUD (head-up display) projection, or any one of numerous known technologies. It is additionally noted that the display device 116 may be configured as any one of numerous types of aircraft flight deck displays. For example, it may be configured as a multi-function display, a horizontal situation indicator, or a vertical situation indicator, just to name a few. In the depicted embodiment, however, the display device 116 is configured as a horizontal situation indicator.

In operation, the display system 100 is also configured to process the current flight status data for the ownship. In this regard, the sources of flight status data generate, measure, and/or provide different types of data related to the operational status of the ownship, the environment in which the ownship is operating, flight parameters, and the like. In practice, the sources of flight status data may be realized using line replaceable units (LRUs), transducers, accelerometers, instruments, sensors, and other well-known devices. The data provided by the sources of flight status data may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display system 100 is suitably designed to process data obtained from the sources of flight status data in the manner described in more detail herein.

In an exemplary embodiment, the datalink unit 119 is suitably configured to support data communication between the ownship and one or more remote systems, e.g., datalink 120. More specifically, the datalink unit 119 is used to receive current flight status data of other aircraft that are near the ownship. In particular embodiments, the datalink unit 119 is implemented as an aircraft-to-aircraft data communication module that receives flight status data from an aircraft other than the ownship. Examples of the data received include, for example, weather information, traffic information, the types of other aircraft, e.g., size of the other aircraft such as a "heavy", the three dimensional direction of travel of the other aircraft, and flight parameters such as airspeed. The datalink unit 119 may be configured for compatibility with ADS-B technology, with TCAS technology, and/or with similar technologies.

It should be understood that FIG. 1 is a simplified representation of a display system 100 for purposes of explanation and ease of description, and FIG. 1 is not intended to limit the application or scope of the subject matter in any way. In practice, the display system 100 will include numerous other devices and components for providing additional functions and features, as will be appreciated in the art.

Figure 2:
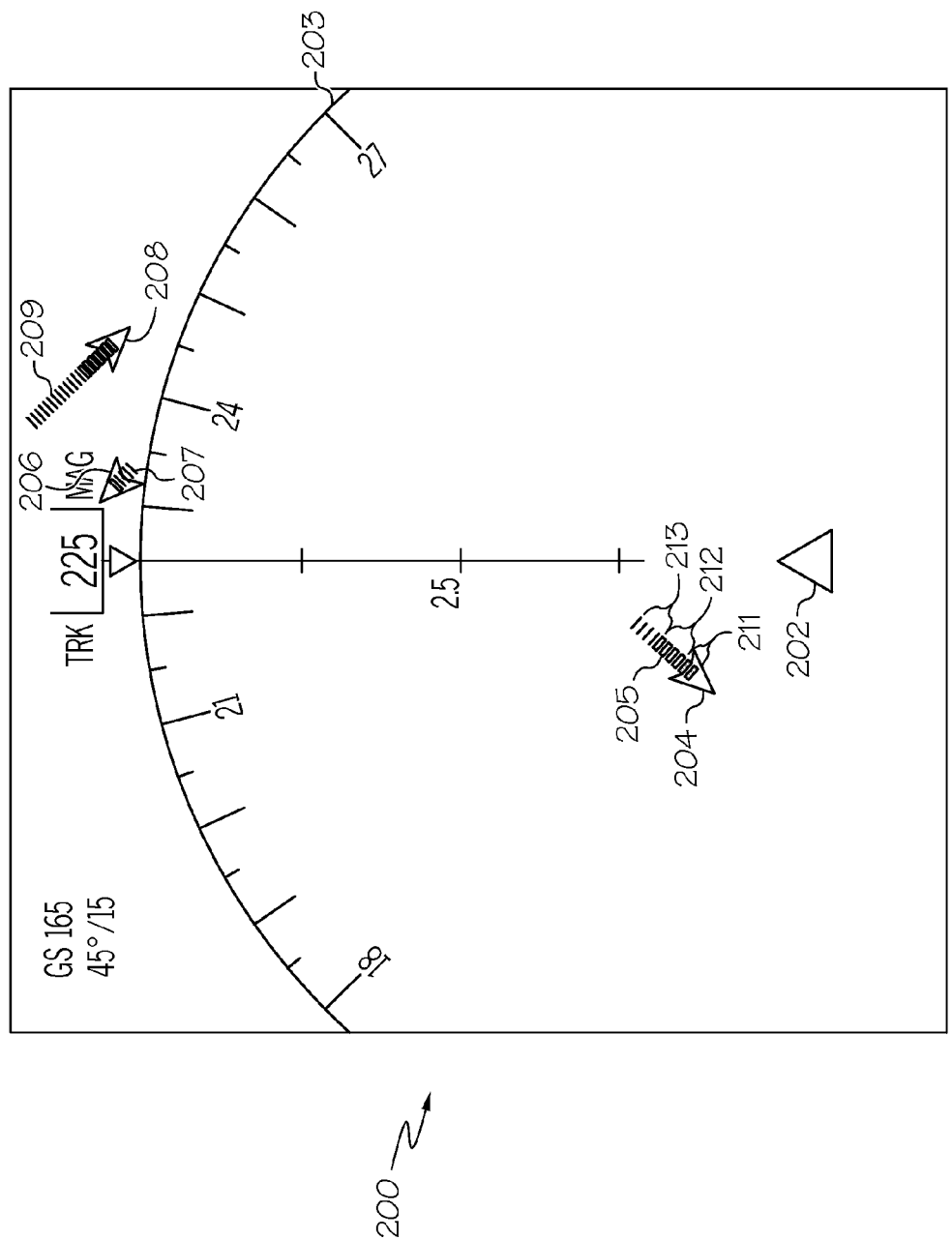
FIG. 2 is an exemplary image that may be rendered on the flight display system of FIG. 1 in accordance with an exemplary embodiment.

With reference to FIG. 2, the display 116 includes a display area 200 in which multiple graphical images may be simultaneously displayed, for example, a heading indicator 203. Although a top down view is depicted, it is understood that a vertical, or perspective, view could be depicted in accordance with the exemplary embodiments. Additional information (not shown) is typically provided in either graphic or numerical format. The display area 200 may also include navigational aids, such as a navigation reference and various map features (not shown) including, but not limited to, terrain, political boundaries, and terminal and special use airspace areas, which, for clarity, are not shown in FIG. 2. A symbol 202 is displayed as the ownship which contains the flight deck display system 100. The location of the symbol 202 of the ownship may be determined, for example, from a GPS.

Data is processed for the ownship and, when received for the other aircraft 204, 206, 208 transmitting aircraft related parameters, such as within the ADS-B system, transmitted directly from the aircraft 204, 206, 208, or a distal source (not shown) such as ground stations or satellites. For this first exemplary embodiment of FIG. 2, the data comprises flight parameters including positional data (location and direction), speed, and aircraft type. An image representing each aircraft 204, 206, 208 is displayed on the display area 200 in a location determined by the positional data. The display of the identification numbers (not shown) may be provided for aircraft 204, 206, 208, respectively, adjacent the aircraft's image 204, 206, 208, for example.

Wake turbulences displayed may be limited to a predefined area, or envelope, such as within a specified distance from the flight path. The envelope may comprise, for example, 2 nm around the ownship, plus/minus 90 degrees of the track ahead to 20 nm. Another example comprises a horizontal distance of 40 nm in front of and 1 nm to the side of the ownship flight path, and an altitude of 3000 feet above and 1000 feet below the ownship flight path for example.

The wake turbulences 205, 207, 209 of each aircraft 204, 206, 208, respectively, are displayed as being within the desired envelope and are a plurality of parallel spaced lines formed perpendicular to the direction of flight of its respective aircraft at the time of generation. The line segments representing the wake turbulences 205, 207, 209 typically will widen the further they are spaced from their respective aircraft 204, 206, 208 since that is the nature of wake turbulences—they "fan out" over time and distance as they age. The location of the generating aircraft is not relevant after generation of the wake segment. Additionally, the line segments of the wake turbulences 205, 207, 209 are formatted for example by line style including thickness, type (dashed, solid), but are preferably colored, to represent a severity (magnitude) of the wake turbulences 205, 207, 209. The stronger wake turbulence 205, 207, 209 closer to the aircraft 204, 206, 208 may be colored red, for example, to indicate a severe turbulence, while the older wake segments may be colored yellow, for example, to indicate a moderate turbulence, and the oldest wake segments may be colored green, for example, to indicate light turbulence. For example, the wake turbulence 205 contains severe turbulence 211, moderate turbulence 212, and light turbulence 213, which are indicated as such in this example by filled rectangles for severe turbulence 211, empty rectangles for moderate turbulence 212, and lines for light turbulence 213. Note that the wake turbulences 205, 207, 209 are mostly aligned straight behind the aircraft 204, 206, 208 since the wind is only 15 knots (as indicated in the upper left of the display).

During the course of this description, like numbers may be used to identify like elements according to the different figures that illustrate the various exemplary embodiments.

Figure 3:
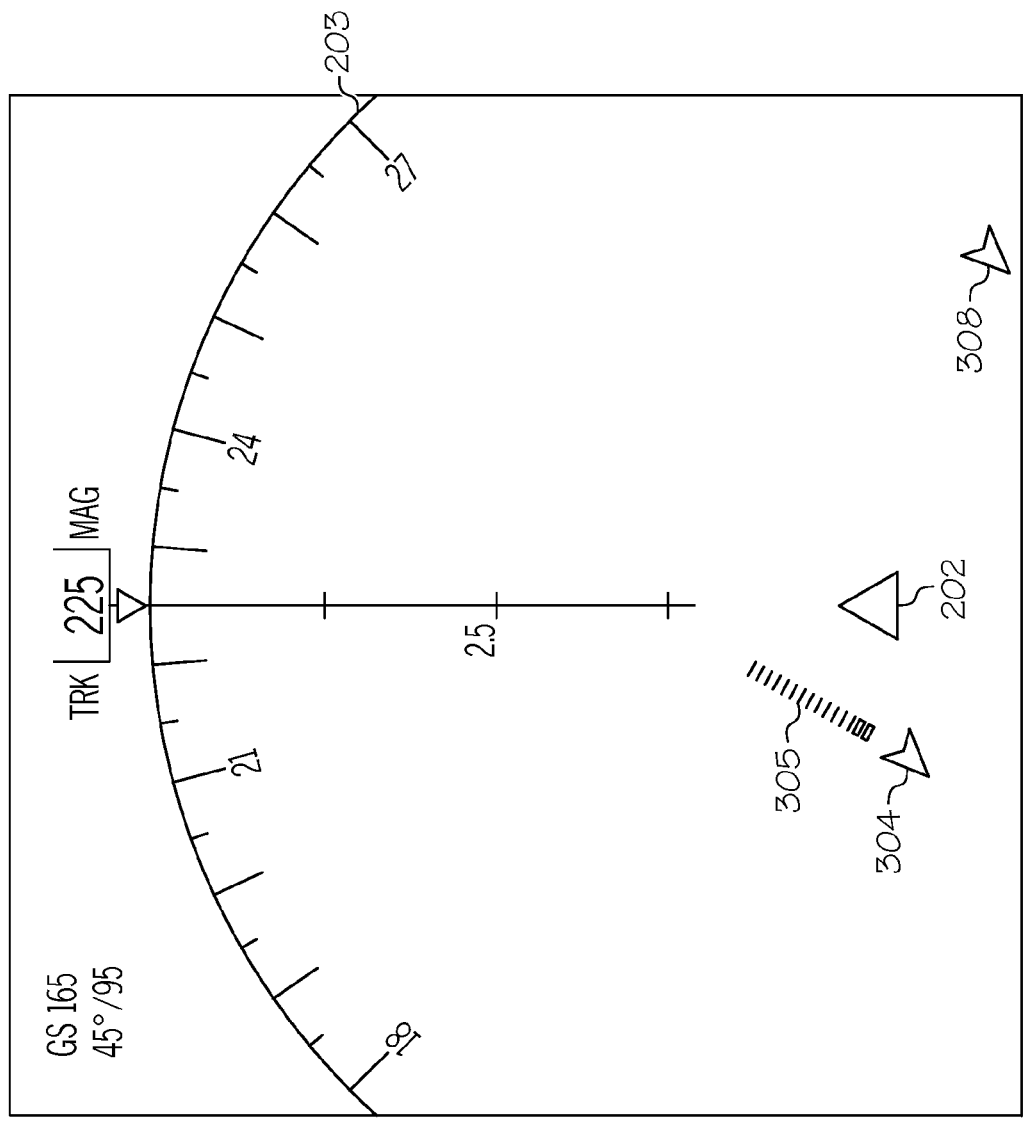
FIG. 3 is an exemplary image that may be rendered on the flight display system of FIG. 1 in accordance with another exemplary embodiment.

Referring to FIG. 3, an aircraft 308 has no wake turbulence and an aircraft 304 is producing a wake turbulence 305. Note how the wake turbulence 305 is not directly behind the aircraft's line of travel. This offset is due to a strong 95 knot wind that "pushes" the wake turbulence away from the aircraft's flight path.

Figure 4:
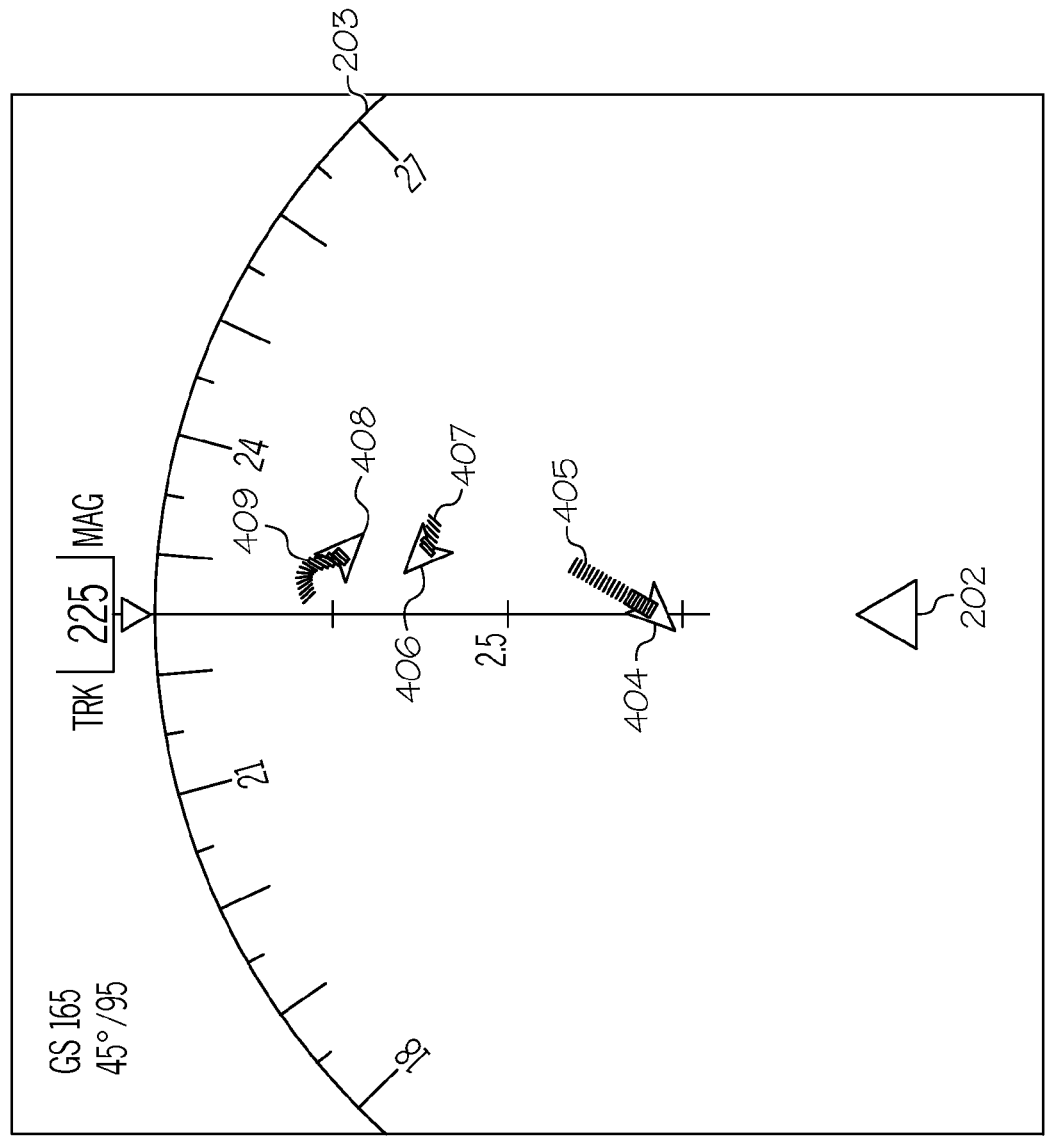
FIG. 4 is an exemplary image that may be rendered on the flight display system of FIG. 1 in accordance with yet another exemplary embodiment.

In FIG. 4, the wake turbulences 405, 407, 409 of each aircraft 404, 406, 408, respectively, are displayed as being within the desired envelope and are a plurality of parallel spaced lines formed perpendicular to the direction of flight of its respective aircraft. The wake turbulence 405 is being blown from the flight path of aircraft 404 by the strong cross wind of 95 knots similar to that of FIG. 3. The wake turbulence 409 is curved indicating that the aircraft 408 has turned, or changed its heading. And the wake turbulence 407 from aircraft 406 is short, indicating that the wake turbulence has only recently appeared within the envelope or may not be very strong.

The format of each displayed wake turbulence segment is defined by an algorithm. The format may include different displayed sizes, colors, or images. For example, the most severe wake turbulence may be a first color, a moderate wake turbulence may be a second color, while a mild wake turbulence may be a third color.

Figure 5:
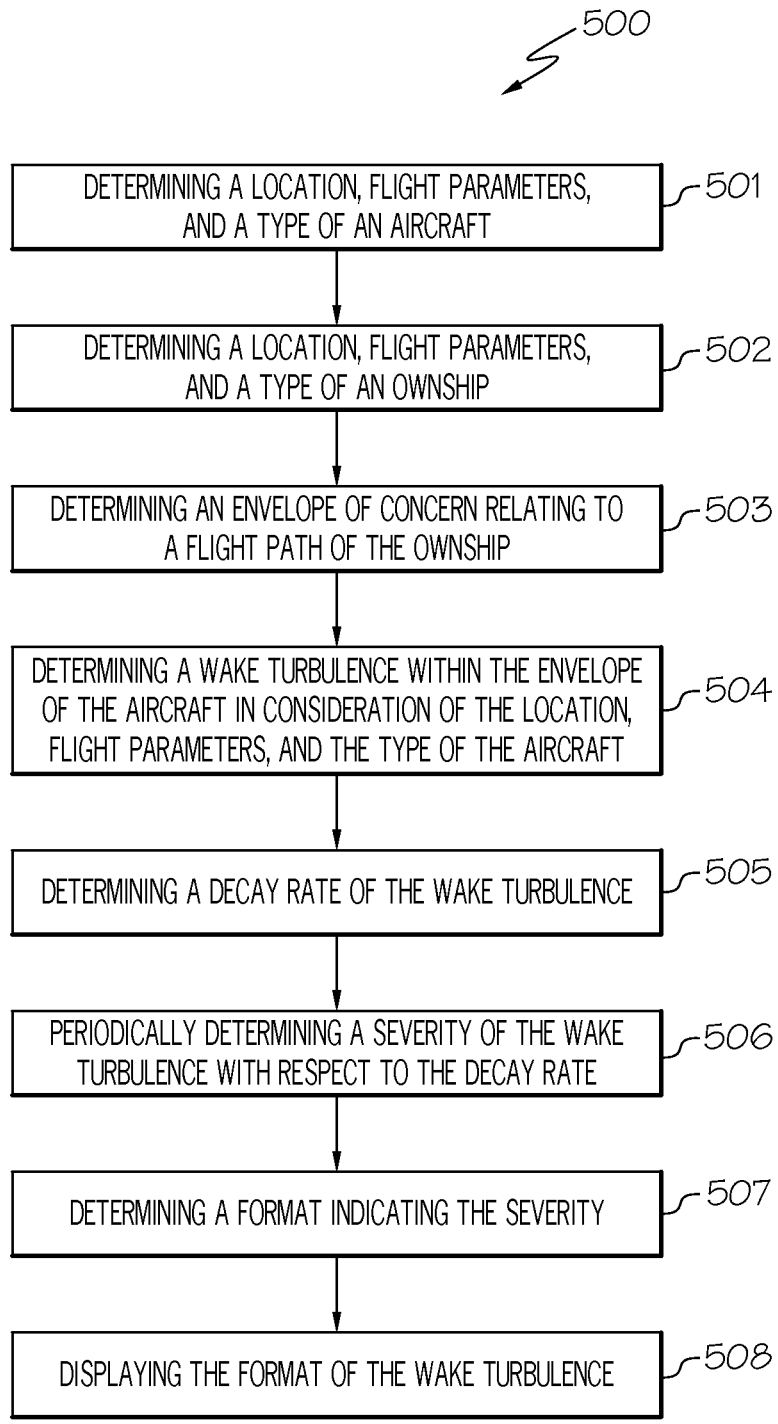
FIG. 5 a flow diagram of an exemplary method suitable for use with the display system of FIG. 1 in accordance with the exemplary embodiments.

FIG. 5 is a flow chart that illustrates an exemplary embodiment of a method 500 suitable for use with a flight deck display system 100. Method 500 represents one implementation of a method for displaying aircraft approaches or departures on an onboard display of an ownship. The various tasks performed in connection with method 500 may be performed by software, hardware, firmware, or any combination thereof. For illustrative purposes, the following description of method 500 may refer to elements mentioned above in connection with preceding FIGS. In practice, portions of method 500 may be performed by different elements of the described system, e.g., a processor, a display element, or a data communication component. It should be appreciated that method 500 may include any number of additional or alternative tasks, the tasks shown in FIG. 5 need not be performed in the illustrated order, and method 500 may be incorporated into a more comprehensive procedure or method having additional functionality not described in detail herein. Moreover, one or more of the tasks shown in FIG. 5 could be omitted from an embodiment of the method 500 as long as the intended overall functionality remains intact.

In accordance with the exemplary method of FIG. 5, method for displaying a wake turbulence of an aircraft with respect to an ownship includes determining 501 a location, flight parameters, and a type of an aircraft; determining 502 a location, flight parameters, and a type of the ownship; determining 503 an envelope of concern relating to a flight path of the ownship; determining 504 a wake turbulence within the envelope of an aircraft in consideration of the location, flight parameters, and the type of that aircraft; periodically determining 505 a decay rate of the wake turbulence; periodically 506 determining a severity of the wake turbulence with respect to the decay rate; determining 507 a format indicating the severity; and displaying 508 the format of the wake turbulence. This method would be accomplished for all relevant aircraft in the defined envelope.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A system for displaying a wake turbulence of an aircraft with respect to an ownship, the system comprising:
    a plurality of data sources configured to determine:
        a location, flight parameters, and a type of the aircraft; and
        a location, flight parameters, and a type of the ownship;
    a processor coupled to the plurality of data sources and configured to determine:
        an envelope relating to a flight path of the ownship;
        a wake turbulence within the envelope of the aircraft in consideration of the location, flight parameters, and the type of the aircraft;
        periodically a decay rate of the wake turbulence;
        periodically a severity of the wake turbulence with respect to the decay rate; and
        a format indicating the severity, the format consisting of a plurality of spaced lines formed perpendicular to the direction of flight when the wake turbulence is determined; and
    a display consisting of a horizontal situation indicator and coupled to the processor and configured to display in a two dimensional view the format of the wake turbulence.

2. The system of claim 1 wherein the flight parameters of the aircraft are determined by aircraft track and altitude, and flight parameters of the ownship are determined by the ownship heading and altitude.

3. The system of claim 1 wherein the type of aircraft is determined by at least one of weight and size of the aircraft, and the type of the ownship is determined by weight and size of the ownship.

4. The system of claim 1 wherein the envelope comprises the space between an altitude above and an altitude below the ownship, and the space within a defined area ahead of and surrounding the ownship.

5. The system of claim 1 wherein determining the severity comprises determining wind speed and direction adjacent to at least one of the aircraft and the ownship.

6. The system of claim 1 wherein the processor is further configured to determine the decay rate by determining wind speed and direction of the ownship, and turbulence sensed by the ownship.

7. The system of claim 1 wherein the location, flight parameters, and type of the aircraft are transmitted to the ownship via an automated dependent surveillance-broadcast system.

8. The system of claim 1 wherein the format indicating severity comprises a plurality of parallel lines perpendicular to the direction of flight of the aircraft at the time of generation of the turbulence, each line formatted to indicate a severity of the turbulence represented by the line.

9. The system of claim 8 wherein the format of each line comprises one of a plurality of colors.

10. The system of claim 8 wherein the format of line comprises one of a plurality of styles.

11. A system for displaying a wake turbulence of an aircraft with respect to an ownship, the system comprising:
    a plurality of data sources configured to determine:
        a location, flight parameters, and a type of the aircraft; and
        a location, flight parameters, and a type of the ownship;

a processor coupled to the plurality of data sources and configured to determine:
an envelope relating to a flight path of the ownship;
a wake turbulence within the envelope of the aircraft in consideration of the location, flight parameters, and the type of the aircraft and the location and type of the ownship;
a symbol for the wake turbulence, the symbol including a plurality of parallel lines formed perpendicular to the flight path of the aircraft when the wake turbulence is determined;
a severity of the wake turbulence of each of the lines of the symbol; and
a decay rate for the severity of each of the lines of the symbol; and
a display consisting of a horizontal situation indicator and coupled to the processor and configured to display in a two dimensional view the symbol of the wake turbulence.

12. A method for displaying a wake turbulence of an aircraft with respect to an ownship, comprising:
determining a location, flight parameters, and a type of the aircraft;
determining a location, flight parameters, and a type of the ownship;
determining an envelope of concern relating to a flight path of the ownship;
determining a wake turbulence within the envelope of the aircraft in consideration of the location, flight parameters, and the type of the aircraft;
periodically determining a decay rate of the wake turbulence;
periodically determining a severity of the wake turbulence with respect to the decay rate;
determining a format indicating the severity, wherein determining the format comprises: providing a plurality of parallel lines perpendicular to the direction of flight of the aircraft, and formatting each line to indicate a severity of the line; and
displaying the format of the wake turbulence in a two dimensional view on a display consisting of a horizontal situation indicator.

13. The method of claim 12 wherein determining the flight parameters of the aircraft include aircraft track and altitude, and flight parameters of the ownship include ownship heading and altitude.

14. The method of claim 12 wherein determining the type of aircraft include determining at least one of weight and size of the aircraft, and the type of the ownship include determining at least one of weight and size of the ownship.

15. The method of claim 12 wherein determining the envelope comprises defining a space between an altitude above and an altitude below the ownship, and the space within a defined area ahead of the ownship.

16. The method of claim 12 wherein determining the severity comprises determining wind speed and direction adjacent at least one of the aircraft and the ownship.

17. The method of claim 12 wherein determining the decay rate includes determining wind speed and direction of the ownship, and turbulence sensed by the ownship.

18. The method of claim 12 wherein the location, flight parameters, and type of the aircraft are transmitted to the ownship via an ADS-B system.

19. The method of claim 12 wherein determining the format of each line comprises assigning one of a plurality of colors to each line.

20. The method of claim 12 wherein determining the format of each line comprises assigning one of a plurality of styles to each line.

* * * * *